US008770772B1

(12) United States Patent
Zhang

(10) Patent No.: US 8,770,772 B1
(45) Date of Patent: Jul. 8, 2014

(54) LUMINOUS KEYBOARD

(71) Applicant: Qing Zhang, Changsu (CN)

(72) Inventor: Qing Zhang, Changsu (CN)

(73) Assignee: Changshu Sunrex Technology Co., Ltd., Jiangsu Province (CN)

( * ) Notice: Subject to any disclaimer, the term of this patent is extended or adjusted under 35 U.S.C. 154(b) by 6 days.

(21) Appl. No.: 13/769,594

(22) Filed: Feb. 18, 2013

(51) Int. Cl.
*G01D 11/28* (2006.01)

(52) U.S. Cl.
USPC ........................................ 362/23.03; 200/5 A

(58) Field of Classification Search
USPC .................. 362/23.03, 23.04, 23.05; 200/5 A
See application file for complete search history.

(56) References Cited

U.S. PATENT DOCUMENTS

| | | | | |
|---|---|---|---|---|
| 7,014,377 | B2 * | 3/2006 | Yamauchi | 400/472 |
| 2012/0182760 | A1 * | 7/2012 | Ohrui et al. | 362/602 |
| 2013/0044506 | A1 * | 2/2013 | Chen | 362/556 |

* cited by examiner

*Primary Examiner* — Evan Dzierzynski
(74) *Attorney, Agent, or Firm* — Brinks Gilson & Lione

(57) ABSTRACT

A luminous keyboard includes: a press key unit and a backlight module unit including a light guiding plate, a plurality of light guiding points, an upper light-permeable thin film disposed on a top surface of the light guiding plate, a lower light-permeable thin film disposed on a bottom surface of the light guiding plate, and a luminous element. The upper and lower light-permeable thin films respectively have refractive indices lower than that of the light guiding plate.

11 Claims, 5 Drawing Sheets

LUMINOUS KEYBOARD

BACKGROUND OF THE INVENTION

1. Field of the Invention

This invention relates to a luminous keyboard.

2. Description of the Related Art

Referring to FIG. 1, a conventional backlight module 1 is shown to comprises: a light guiding plate 11, a plurality of light guiding points 12 disposed on a lower surface of the light guiding plate 11, a reflector 13 disposed under the light guiding plate 11, a diffuser 14 disposed on the light guiding plate 11, a prism 15 disposed on the diffuser 14, and a luminous element 16 disposed on a side of the light guiding plate 11. The conventional backlight module 1 is usually used in a keyboard or a display panel of an electronic device. However, the effect of optical guidance for the conventional backlight module 1 is non-uniform, which results in undesirable illumination efficiency for the keyboard or the display panel. For example, the optical intensity would be gradually attenuated due to long propagation distance of light beams. In addition, the light beams that bypass the light guiding points 12 and are directly emitted toward the diffuser 14 would result in optical loss.

SUMMARY OF THE INVENTION

Therefore, an object of the present invention is to provide a luminous keyboard that can overcome the aforesaid drawbacks associated with the prior art.

Accordingly, a luminous keyboard of this invention comprises:

a press key unit including a plurality of press keys; and a backlight module disposed under the press key unit and including a light guiding plate, a plurality of light guiding points which are formed on a bottom surface of the light guiding plate and corresponding in position to the press keys, an upper light-permeable thin film disposed on a top surface of the light guiding plate, a lower light-permeable thin film that is disposed on the bottom surface, that is opposite to the upper light-permeable thin film and that covers the light guiding points, and a luminous element from which light beams are incident to the light guiding plate;

wherein the upper and lower light-permeable thin films respectively have refractive indices lower than that of the light guiding plate so that a total internal reflection of the light beams occurs between the upper and lower light-permeable thin films, and the light guiding points scatter and direct the light beams to pass through the upper light-permeable thin film and to illuminate said press keys.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENTS

Figure 1:
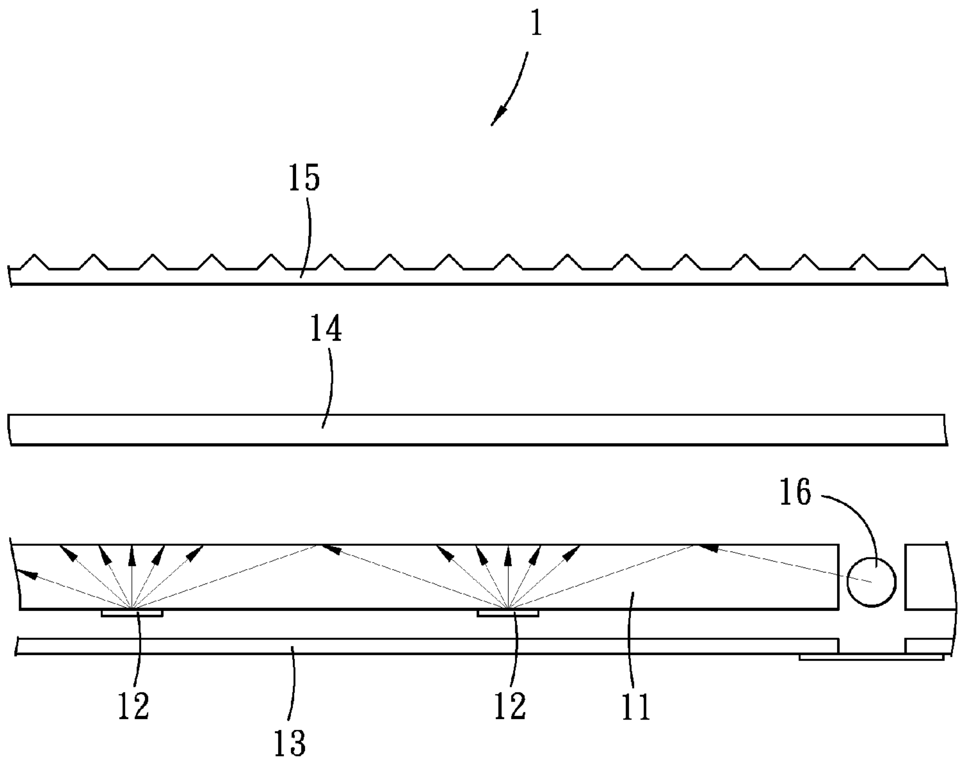
FIG. 1 PRIOR ART
FIG. 1 is a schematic diagram of a conventional backlight module.
Figure 2:
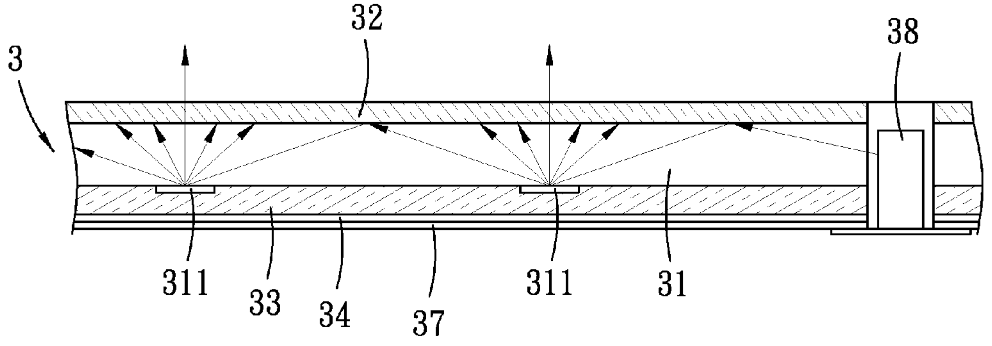
FIG. 2 is a fragmentary sectional view of a backlight module of the preferred embodiment according to this invention.

FIG. 2 is a sectional view of a backlight module 3 of the preferred embodiment according to this invention. The backlight module 3 comprises: a light guiding plate 31, a plurality of light guiding points 311 formed on a bottom surface of the light guiding plate 31 (two light guiding points 311 are shown for illustration), an upper light-permeable thin film 32 disposed on a top surface of the light guiding plate 31, a lower light-permeable thin film 33 disposed on the bottom surface of the light guiding plate 31 and opposite to the upper light-permeable thin film 32, and a luminous element 38 from which light beams are incident to the light guiding plate 31.

Figure 3:
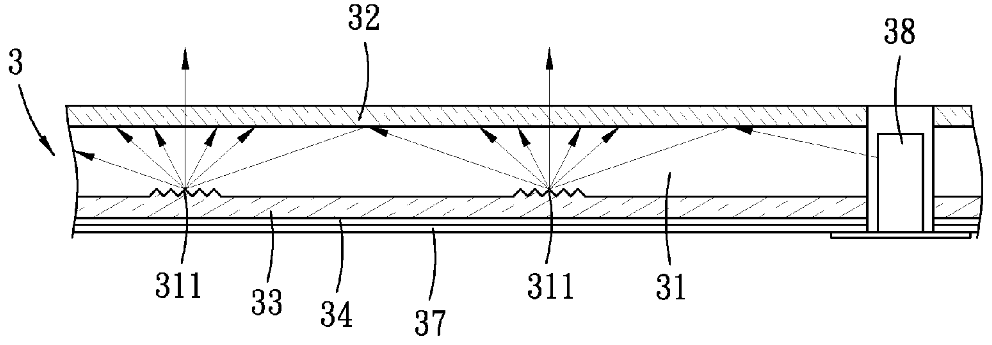
FIG. 3 is a fragmentary sectional view showing a modification of the backlight module of the preferred embodiment, in which the light guiding point has a plurality of microstructures.

In the preferred embodiment, each of the light guiding points 311 is a light guiding coating, e.g., a printed light guiding ink, to reflect the light beams. Alternatively, each of the light guiding points 311 is composed of a plurality of microstructures (see FIG. 3) formed by roughening the bottom surface of the light guiding plate 31. The microstructures formed on the bottom surface of the light guiding plate 31 could scatter the light beams to the upper light-permeable thin film 32. The microstructures can be composed of alternate peaks and valleys.

The upper and lower light-permeable thin films 32, 33 respectively have refractive indices lower than that of the light guiding plate 31 so that a total internal reflection of the light beams occurs between the upper and lower light-permeable thin films 32, 33. The lower light-permeable thin film 33 covers the light guiding points 311. The materials and the refractive indices for the upper and lower light-permeable thin films 32, 33 can be the same or different. In the preferred embodiment, the upper and lower light-permeable thin films 32, 33 are made of light curable resins or optical coating materials. Examples of the light curable resins and optical coating materials include acrylic resin (refractive index=1.41), magnesium chloride (refractive index=1.38), barium chloride (refractive index=1.48), and silicon dioxide (refractive index=1.46).

In this preferred embodiment, the light guiding plate 31 is flat and light-permeable. Materials suitable for the light guiding plate 31 include polymethylmethacrylate (PMMA, refractive index=1.49), polypropylene (PP, refractive index=1.49), polyethylene terephthalate (PET, refractive index=1.58), polycarbonate (PC, refractive index=1.59), and polystyrene (PS, refractive index=1.59).

The materials for the light guiding plate 31 and the upper and lower light-permeable thin films 32, 33 are not limited to the aforesaid materials as long as the refractive index of each of the upper and lower light-permeable thin films 32, 33 is lower than that of the light guiding plate 31. The luminous element 38 is a light emitting diode and is disposed at one side of the light guiding plate 31 for emitting the light beams into the light guiding plate 31. The luminous element 38 can be composed of a plurality of light emitting diodes or other kinds of light sources.

The backlight module 3 further includes a light-reflecting coating layer 34 and a light blocking coating layer 37. The light-reflecting coating layer 34 is formed on a bottom surface of the lower light-permeable thin film 33 so as to reflect the light beams that leak from the lower light-permeable thin film 33 to the light guiding plate 31, thereby resulting in improved light utilization. In the preferred embodiment, the light-reflecting coating layer 34 is made of a light-reflecting ink purchased from Shanghai Phichem Coporation (Model No.: KYC-M-100C).

The light blocking coating layer 37 is formed on a bottom surface of the light-reflecting coating layer 34 so as to prevent leakage of the light beams from the light-reflecting coating layer 34 and protect the light guiding plate 31 from damage. In the preferred embodiment, the light-blocking coating layer 37 is made of a light-blocking ink purchased from Shanghai Phichem Coporation (Model No.: KYC-D-1).

Figure 4:
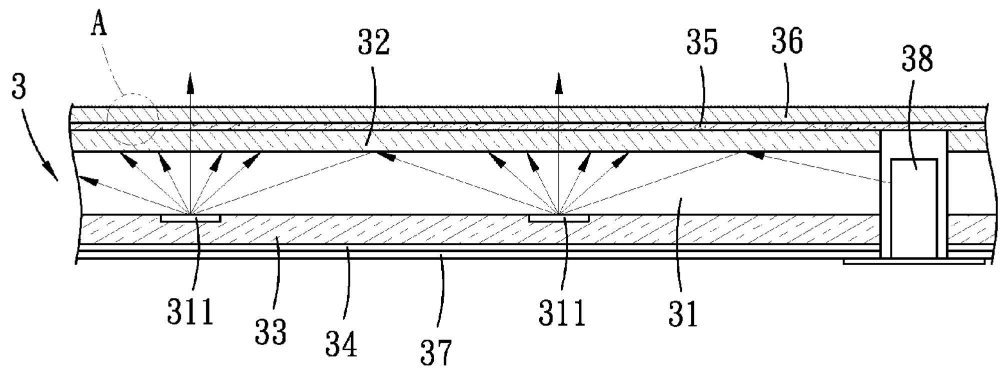
FIG. 4 is a fragmentary sectional view showing another modification of the backlight module of the preferred embodiment.
Figure 5:
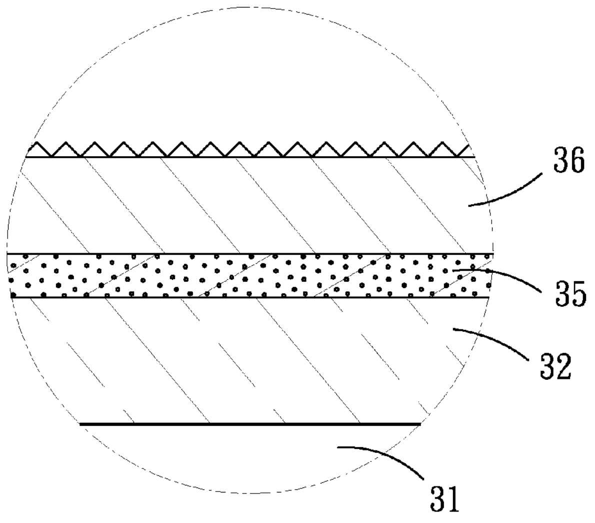
FIG. 5 is an enlarged view of an encircled portion (A) in FIG. 4.

FIG. 4 is a sectional view showing a modification of the preferred embodiment. FIG. 5 is an enlarged view of an encircled portion (A) in FIG. 4. Referring to FIGS. 4 and 5, in this modification, the backlight module further comprises a diffuser 35 disposed on a top surface of the upper light-permeable film 32, and a brightness enhancement film (BEF) 36 disposed on a top surface of the diffuser 35.

The diffuser 35 has a plurality of micro-particles for diffusing the light beams. The brightness enhancement film 36 has a top surface which is formed with a plurality of micro-prism structures for raising luminance of the light beams. The diffuser 35 and the brightness enhancement film 36 can be formed using direct coating techniques. Since the diffuser 35 and the brightness enhancement film 36 are well known in the art, modifications thereof can be achieved by skilled artisans based on their own knowledge.

The light beams which are incident to the light guiding points 311 scatter at various incident angles. Each of the light beams which has an incident angle smaller than a critical angle would not be subject to the total internal reflection and would be emitted outwardly through the upper light-permeable thin film 32 (shown by the arrows in the normal direction in FIGS. 2 to 4). The light beams which have incident angles greater than the critical angle would be subject to total internal reflection and thus are propagated in the light guiding plate 31.

Figure 6:
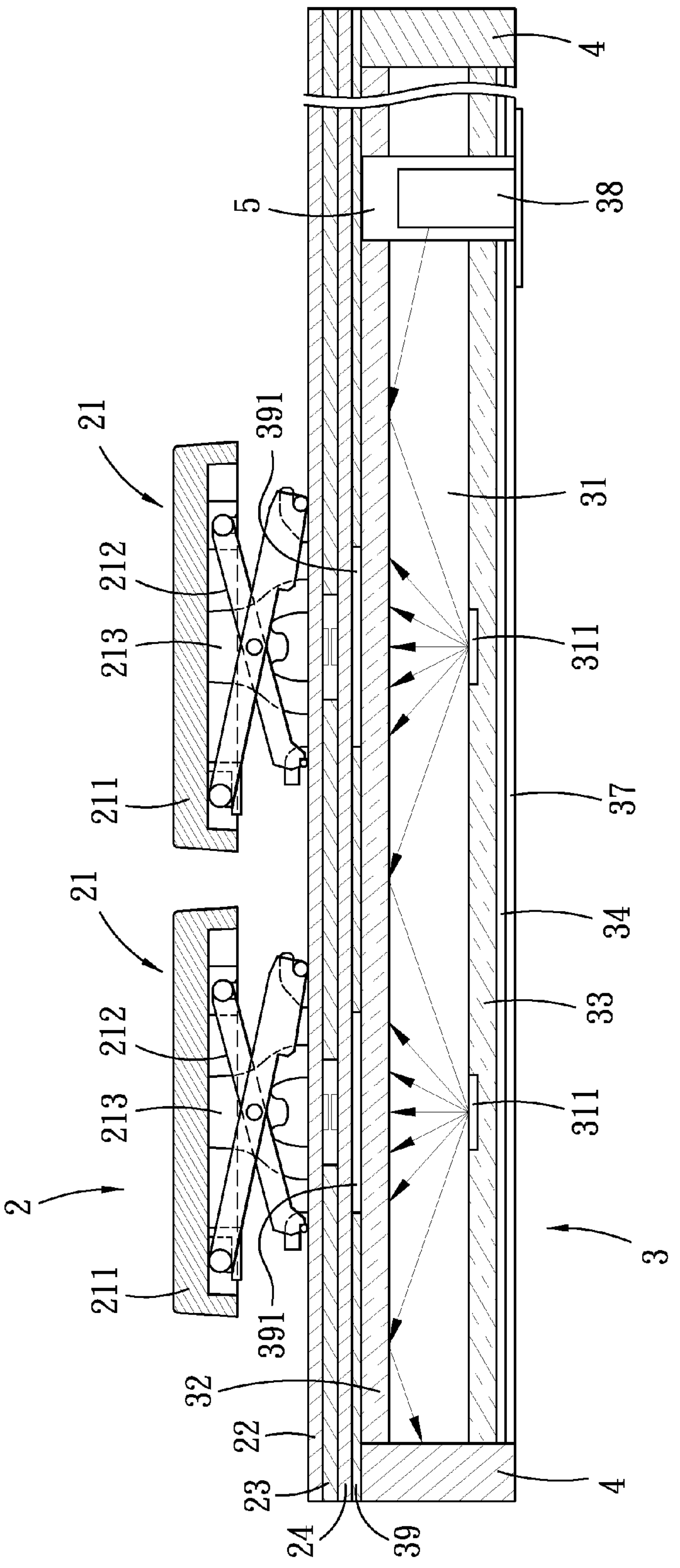
FIG. 6 is a sectional view of a luminous keyboard of the preferred embodiment according to this invention.

FIG. 6 illustrates a luminous keyboard of the preferred embodiment according to this invention. The luminous keyboard comprises a press key unit 2, a backlight module 3, and a pair of lateral baffle walls 4.

The press key unit 2 includes a plurality of press keys 21, an insulator thin film 22 disposed under the press keys 21, a membrane circuit board 23 disposed under the insulator thin film 22 so as to generate signals, and a supporting member 24 disposed under the membrane circuit board 23 to support the press keys 21, the insulator thin film 22, and the membrane circuit board 23.

Each of the press keys 21 has a key cap 211, a scissors linkage 212 disposed between the key cap 211 and the insulator thin film 22 for vertical movement and support of the key cap 211, and an elastic member 213 that is disposed between the key cap 211 and the insulator thin film 22 and that is capable of contact with the membrane circuit unit 23. In this embodiment, the elastic member 213 is a rubber dome.

In this embodiment, the supporting member 24 is a substrate made of metal or plastic.

The backlight module 3 is disposed under the press key unit 2, and includes the basic components of the backlight module 3 of the preferred embodiment, i.e., the light guiding plate 31, the light guiding points 311 which correspond in position to the press keys 21, the upper and lower light-permeable thin films 32, 33, the light-reflecting coating layer 34, the light blocking coating layer 37, and the luminous element 38.

In the luminous keyboard of the preferred embodiment according to this invention, the backlight module 3 further includes a shading element 39. The shading element 39 is a light blocking plate and is disposed on the upper light-permeable thin film 32 for preventing leakage of the light beams. The shading element 39 is formed with a plurality of openings 391 corresponding in position to the light guiding points 311 which provide the light beams with a progressing path. Specifically, the light beams that are scattered from the light guiding points 311 and that pass though the upper light-permeable thin film 32 would travel through the openings 36 toward the press keys 21.

The backlight module 3 further defines a receiving space 5 which penetrates the upper light-permeable thin film 32, the light guiding plate 31, the lower light-permeable thin film 33, the light-reflecting coating layer 34, and the light blocking coating layer 37. The receiving space 5 is used for receiving the luminous element 38 and is covered by the shading element 39 to prevent light leakage therefrom.

The lateral baffle walls 4 are disposed to cover two lateral sides of the light guiding plate 31 and the upper and lower light-permeable thin films 32, 33 so as to prevent lateral light leakage of the light beams.

Figure 7:
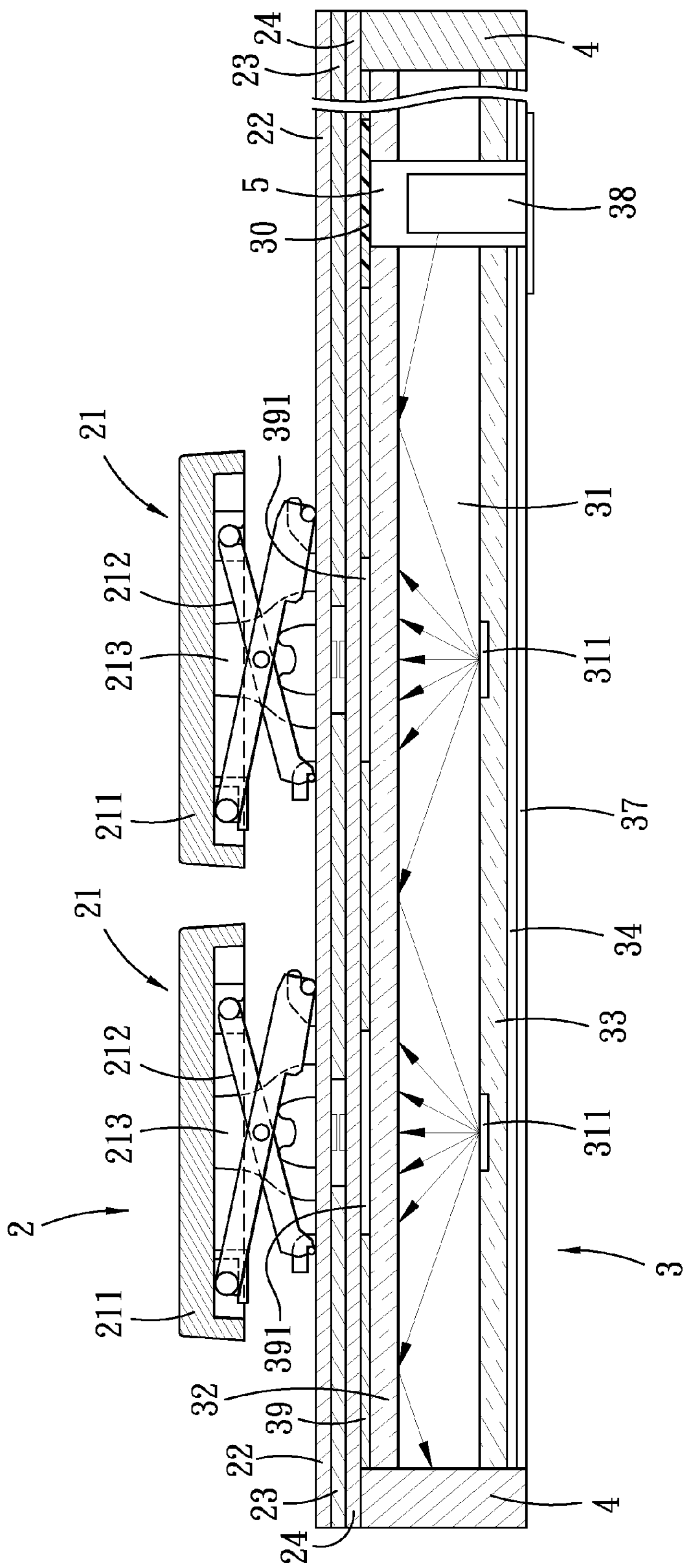
FIG. 7 is a sectional view showing a modification of the luminous keyboard of the preferred embodiment.

FIG. 7 illustrates a modification of the luminous keyboard of the preferred embodiment according to this invention. The modification focuses on the shading element 39. Specifically, in this modification, the shading element 39 is a light blocking coating layer made of a material identical to the light-blocking coating layer 37, and the backlight module 3 further includes an upper baffle plate 30 embedded in the shading element 39 to cover the receiving space 5.

To sum up, with the upper and lower light-permeable thin films 32, 33 having refractive indices lower than that of the light guiding plate 31, total internal reflection could occur between the upper and lower light-permeable thin films 32, 33. Thus, light attenuation due to light leakage during propagation in the light guiding plate 31 could be alleviated, and light utilization efficiency and illumination efficiency for the luminous keyboard can be raised.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A luminous keyboard, comprising:
   a press key unit including a plurality of press keys; and
   a backlight module disposed under said press key unit and including a light guiding plate, a plurality of light guiding points which are formed on a bottom surface of said light guiding plate and corresponding in position to said press keys, an upper light-permeable thin film disposed on a top surface of said light guiding plate, a lower light-permeable thin film that is disposed on said bottom surface, that is opposite to said upper light-permeable thin film and that covers said light guiding points, and a luminous element from which light beams are incident to said light guiding plate;
   wherein said upper and lower light-permeable thin films respectively have refractive indices lower than that of said light guiding plate so that a total internal reflection of the light beams occurs between said upper and lower light-permeable thin films, and said light guiding points scatter and direct the light beams to pass through said upper light-permeable thin film and to illuminate said press keys.

2. The luminous keyboard of claim 1, wherein said backlight module further includes a light-reflecting coating layer formed on a bottom surface of said lower light-permeable thin film so as to reflect light beams that leak from said lower light-permeable thin film to said light guiding plate.

3. The luminous keyboard of claim 2, wherein said backlight module further includes a light-blocking coating layer coated on a bottom surface of said light-reflecting coating layer so as to prevent leakage of the light beams.

4. The luminous keyboard of claim 2, wherein said backlight module further includes a shading element disposed on said upper light-permeable thin layer for preventing leakage of the light beams, said shading element being formed with a plurality of openings corresponding in position to said light guiding points and providing the light beams with a progressing path.

5. The luminous keyboard of claim 4, wherein said backlight module further defines a receiving space that penetrates said upper light-permeable thin film, said light guiding plate, said lower light-permeable thin film, and said light-reflecting coating layer, and that is used for receiving said luminous element.

6. The luminous keyboard of claim 5, wherein said shading element is a light blocking plate disposed on said upper light-permeable thin film and covering said receiving space.

7. The luminous keyboard of claim 5, wherein said shading element is a light blocking coating, said backlight module further including an upper baffle plate embedded in said shading element to cover said receiving space.

8. The luminous keyboard of claim 1, further comprising a lateral baffle wall surrounding said light guiding plate so as to prevent leakage of the light beams.

9. The luminous keyboard of claim 1, wherein said press key unit further includes an insulator thin film disposed under said press keys, a membrane circuit unit disposed under said insulator thin film, and a supporting member disposed under said membrane circuit unit so as to support said press keys, said insulator thin film, and said membrane circuit board.

10. The luminous keyboard of claim 1, wherein each of said light guiding points has a light-guiding coating to reflect the light beams toward said press keys.

11. The luminous keyboard of claim 1, wherein each of said light guiding points has a plurality of microstructures formed on said bottom surface of said light guiding plate so as to scatter the light beams toward said press keys.

* * * * *